United States Patent
Li et al.

(10) Patent No.: US 12,055,433 B2
(45) Date of Patent: Aug. 6, 2024

(54) GRATING ENHANCED DISTRIBUTED VIBRATION DEMODULATION SYSTEM AND METHOD BASED ON THREE-PULSE SHEARING INTERFERENCE

(71) Applicant: Wuhan University of Technology, Wuhan (CN)

(72) Inventors: Zhengying Li, Wuhan (CN); Jun Wu, Wuhan (CN); Zhenyu Deng, Wuhan (CN); Xuelei Fu, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 372 days.

(21) Appl. No.: 17/580,870

(22) Filed: Jan. 21, 2022

(65) Prior Publication Data
US 2022/0326068 A1    Oct. 13, 2022

Related U.S. Application Data

(63) Continuation of application No. PCT/CN2021/120472, filed on Sep. 24, 2021.

(30) Foreign Application Priority Data

Apr. 12, 2021 (CN) .......................... 202110389593.5

(51) Int. Cl.
*H01S 3/06* (2006.01)
*G01H 9/00* (2006.01)
*H01S 3/067* (2006.01)

(52) U.S. Cl.
CPC ......... *G01H 9/004* (2013.01); *H01S 3/06712* (2013.01); *H01S 3/06754* (2013.01)

(58) Field of Classification Search
CPC ...................................................... G01H 9/004
(Continued)

(56) References Cited

U.S. PATENT DOCUMENTS

| 6,825,963 B2 * | 11/2004 | Kittaka ................ G02B 6/1225 359/321 |
| 6,898,351 B2 * | 5/2005 | Yeniay ................ G02B 6/2746 385/39 |

(Continued)

FOREIGN PATENT DOCUMENTS

| CN | 102147552 A | 8/2011 |
| CN | 106840221 A | 6/2017 |

(Continued)

*Primary Examiner* — Kaveh C Kianni
(74) *Attorney, Agent, or Firm* — Nitin Kaushik (57) ABSTRACT

The present invention discloses a grating enhanced distributed vibration demodulation system based on three-pulse shearing interference, comprising: a laser device, a pulse optical modulator, a three-pulse generation polarization-maintaining structure, a first erbium-doped fiber amplifier, a first optical circulator, a fiber grating array, a second erbium-doped fiber amplifier, a second optical circulator, a three-in-three optical coupler, a first Faraday rotator mirror, a second Faraday rotator mirror, and a four-channel data acquisition card, On the basis of a distributed fiber grating vibration sensing system, three-pulse dislocation interference and three-in-three optical coupler digital phase demodulation technologies are adopted, XX and XY pulses are utilized to complement interference visibility, and demodulation is performed by selecting a better path, so that polarization fading resistance and interference signal high visibility in the distributed fiber grating vibration sensing system are realized.

10 Claims, 2 Drawing Sheets

(58) Field of Classification Search
USPC .......................................................... 385/37
See application file for complete search history.

(56) References Cited

U.S. PATENT DOCUMENTS

| | | | | |
|---|---|---|---|---|
| 6,937,782 | B2* | 8/2005 | Robinson | G02F 1/3515 385/47 |
| 7,005,669 | B1* | 2/2006 | Lee | B82Y 20/00 257/17 |
| 7,046,867 | B2* | 5/2006 | Bohnert | G01R 15/247 385/12 |
| 7,298,949 | B2* | 11/2007 | Gothoskar | G02F 1/025 385/2 |
| 7,310,454 | B2* | 12/2007 | Akiyama | G02F 1/21 385/5 |
| 7,310,468 | B2* | 12/2007 | Kittaka | G02B 6/1225 385/14 |
| 7,474,408 | B2* | 1/2009 | Alphonse | A61B 5/0059 356/479 |
| 8,027,587 | B1* | 9/2011 | Watts | G02B 6/12007 359/107 |
| 9,897,827 | B1* | 2/2018 | Kim | G02B 6/2746 |
| 10,009,135 | B2* | 6/2018 | Tait | H04B 10/80 |
| 10,133,141 | B2* | 11/2018 | Evans | G02F 1/2257 |
| 11,016,315 | B2* | 5/2021 | Nahmias | G02F 1/025 |
| 2004/0027646 | A1* | 2/2004 | Miller | G02B 6/1225 359/322 |
| 2004/0170351 | A1* | 9/2004 | Fishman | G02F 1/3136 385/39 |
| 2004/0184711 | A1* | 9/2004 | Bradley | G02B 6/12007 385/16 |
| 2005/0259999 | A1* | 11/2005 | Covey | G02F 3/00 398/188 |
| 2009/0174931 | A1* | 7/2009 | Huber | H01S 3/06791 372/18 |
| 2010/0296775 | A1* | 11/2010 | Png | G02B 6/12004 385/129 |
| 2014/0176937 | A1* | 6/2014 | Liu | G01D 5/35329 356/73.1 |
| 2017/0336564 | A1* | 11/2017 | Soref | G02F 1/3133 |
| 2019/0187380 | A1* | 6/2019 | Fanto | G02B 6/12 |
| 2019/0331912 | A1* | 10/2019 | Tait | G02F 1/225 |
| 2021/0048337 | A1* | 2/2021 | Wang | G01D 5/35316 |

FOREIGN PATENT DOCUMENTS

| | | | | |
|---|---|---|---|---|
| CN | 108759884 A | | 11/2018 | |
| CN | 109238355 A | | 1/2019 | |
| CN | 110768715 A | | 2/2020 | |
| CN | 112097813 A | | 12/2020 | |
| CN | 113188647 A | * | 7/2021 | ......... G01D 5/35325 |
| WO | WO-2010047936 A2 | * | 4/2010 | ......... H01S 3/06791 |

* cited by examiner

GRATING ENHANCED DISTRIBUTED VIBRATION DEMODULATION SYSTEM AND METHOD BASED ON THREE-PULSE SHEARING INTERFERENCE

CROSS-REFERENCE TO RELATED APPLICATIONS

The application claims priority to Chinese patent application No. 2021103895935, filed on Apr. 12, 2021, the entire contents of which are incorporated herein by reference.

TECHNICAL FIELD

The present invention relates to the technical field of fiber sensing, and in particular, to a grating enhanced distributed vibration demodulation system and method based on three-pulse shearing interference.

BACKGROUND

Since the advent of a fiber sensing technology, it has been widely concerned and intensively researched with many advantages. A fiber as a sensor is widely researched and applied because of passiveness, small size and easy reuse. A fiber sensing system utilizing phase-sensitive optical time domain reflectometry (φ-OTDR) is also characterized by high sensitivity, which has very important application value in many fields. Compared with traditional electrical sensing systems, the fiber sensing system has better sensing performance and wider application prospect in various harsh environments. In order to improve the positioning accuracy and detection sensitivity to achieve the sensing of small signals, researchers introduced weak grating arrays in the traditional systems, and used a fiber between two adjacent gratings in a weak fiber grating array as a sensing unit to achieve a high-accuracy and high-sensitivity distributed detection system based on time division multiplexing. Vibration is one of the most common phenomena in nature. The acquisition of vibration signals plays an important role in various fields. It is also an important research direction and application field in a grating-enhanced distributed sensing technology, and has wide application prospects in seismic wave detection, oil exploration, underwater military and other fields.

At present, polarization-induced fading is a problem that restricts the large-scale application of a distributed interferometric fiber grating vibration sensing system. A phenomenon of birefringence occurs when light passes through an anisotropic crystal. The phenomenon of birefringence causes a light wave to be decomposed into two kinds of polarized light with vibration directions perpendicular to each other, different propagation speeds and different refractive indexes. Light obeying the law of refraction is called o-light, and light not obeying the law of refraction is called e-light. In an ideal case, i.e. assuming that the cross section of a fiber is right circular, there is no bending in a length direction, there is no impurity in materials, the phase velocity is the same, and phases are the same, synthesized light is linearly polarized light. However, in practice, there are some problems in the process of manufacturing and using a single-mode fiber, such as uneven material distribution caused by an imperfect manufacturing process, which leads to the bending and twisting of fibers during use, resulting in deformation, internal stress, etc. These problems may lead to optical anisotropy of a fiber medium, resulting in birefringence. In a large-scale distributed interferometric sensing system, a fiber birefringence effect of the system will cause a polarization state of light transmitted in a fiber to change randomly. The random change of the polarization state will cause the interference visibility of an interference signal at an output end to change randomly from 0 to 1. If the polarization states of two beams of interference light are orthogonal, the interference visibility of the interference light is 0, and polarization fading will occur. The decrease of the visibility will lead to the reduction of a signal-to-noise ratio after demodulation, and even no signal can be demodulated. In practical applications, the problem of misjudgment or the lack of required signals will be caused. Therefore, polarization fading is an important problem affecting its performance A suppression technology of polarization fading is one of the key technologies in the application of interferometric sensors.

At present, the commonly used methods to solve the problem of polarization fading include an optical path full polarization-maintaining technology, a polarization diversity reception technology, a polarization scrambling method, a Faraday rotator mirror method, a polarization switching technology, etc. The optical path full polarization-maintaining technology is to replace ordinary optical devices in an optical path with polarization-maintaining devices, there is basically no birefringence effect in the optical path, but the devices are high in cost and not easy to reuse. The polarization diversity reception technology is to perform polarization detection at a receiving end according to a polarization direction, there are usually three paths of receiving ends with polarization states mutually 60 degrees in space, which can ensure that at least one of the three receiving ends will not produce polarization fading, but this method makes the receiving ends complex while the minimum visibility is only 0.38. The polarization scrambling method is to use a polarization scrambler to modulate linearly polarized light in an optical path to depolarized light at a high speed, this method ensures that interference light will not be affected by the polarization state, but will introduce a larger polarization noise and reduce the light intensity. The Faraday rotator mirror method is to use a Faraday rotator mirror to cancel the birefringence effect of round-trip in the optical path, but each sensing point needs two Faraday rotator mirrors, so that the cost is too high and the applicability is narrow. The polarization switching technology is to use a polarization controller to make the polarization state of an output pulse change in two orthogonal directions (set to X and Y directions). By constructing a Jones matrix of a sensing fiber to eliminate the influence of polarization fading, a constant visibility of 1 can be achieved. However, the polarization switching technology requires a polarization switch in the system, which cannot be passive and requires negative feedback control. In addition, since four interference pulses in the same sensing region are needed to demodulate a signal, the utilization rate of a sampling rate is only ¼ of a practical utilization rate.

The existing polarization fading resistance methods have their own shortcomings, and most of the methods are not low in cost. Therefore, it is necessary to find a polarization fading resistance method with high minimum visibility, wide applicability and high cost performance.

SUMMARY

An object of the present invention is to provide a grating enhanced distributed vibration demodulation system and method based on three-pulse shearing interference. On the basis of a distributed fiber grating vibration sensing system, three-pulse dislocation interference and three-in-three optical coupler digital phase demodulation technologies are adopted. A group of three-pulse light signals having three pulses with polarization states of X, X and Y in which the polarization states of the first two pulses are the same (the polarization state is set to X) and the polarization state of the third pulse is orthogonal to the first two pulses (the polarization state is set to Y) are utilized. During the interference, an XX interference pulse (an X polarization state pulse returned by an $N^{th}$ grating interferes with an X polarization state pulse returned by an $(N+1)^{th}$ grating) and an XY interference pulse (a Y polarization state pulse returned by the $N^{th}$ grating interferes with the X polarization state pulse returned by the $(N+1)^{th}$ grating) in a sensing region are acquired by shearing interference. The interference visibility of the two pulses is complementary and the sum of squares is 1. After demodulation, a better path is selected for output, so as to realize polarization fading resistance in the distributed fiber grating vibration sensing system. The visibility is greater than 0.7, and an interference signal with high visibility is obtained.

In order to achieve this object, the present invention designs a grating enhanced distributed vibration demodulation system based on three-pulse shearing interference, comprising: a laser device, a pulse optical modulator, a three-pulse generation polarization-maintaining structure, a first erbium-doped fiber amplifier, a first optical circulator, a fiber grating array, a second erbium-doped fiber amplifier, a second optical circulator, a three-in-three optical coupler, a first Faraday rotator mirror, a second Faraday rotator mirror, and a four-channel data acquisition card, wherein a signal output end of the laser device is connected to a signal input end of the pulse optical modulator, a light pulse output end of the pulse optical modulator is connected to a signal input end of the three-pulse generation polarization-maintaining structure, a signal output end of the three-pulse generation polarization-maintaining structure is connected to a signal input end of the first erbium-doped fiber amplifier, a signal output end of the first erbium-doped fiber amplifier is connected to a first communication port of the first optical circulator, a second communication port of the first optical circulator is connected to the fiber grating array via a sensing delay fiber, a third communication port of the first optical circulator is connected to a signal input end of the second erbium-doped fiber amplifier, a signal output end of the second erbium-doped fiber amplifier is connected to a first communication port of the second optical circulator, a second communication port of the second optical circulator is connected to a first communication end on a left side of the three-in-three optical coupler, a first communication end on a right side of the three-in-three optical coupler is connected to a communication end of the first Faraday rotator mirror, a second communication end on the right side of the three-in-three optical coupler is suspended, a third communication end on the right side of the three-in-three optical coupler is connected to a communication end of the second Faraday rotator mirror through an interferometer delay fiber, and a third port of the second optical circulator, a second communication end on the left side of the three-in-three optical coupler, and a third communication end on the left side of the three-in-three optical coupler are connected to an input end of the four-channel data acquisition card through a multi-channel photoelectric detector respectively.

A demodulation method for the above system is characterized by including the following steps:

step 1: outputting, by a laser device, a continuous light signal to a pulse optical modulator;

step 2: modulating, by a pulse optical modulator, the continuous light signal into light pulses using electrical pulses generated by a dual-channel pulse program generator, outputting a three-pulse light signal with polarization states of X, X and Y via a three-pulse generation polarization-maintaining structure, and after the three-pulse light signal with polarization states of X, X and Y enters a first erbium-doped fiber amplifier, outputting a three-pulse light signal with peak power amplified;

step 3: accessing the three-pulse light signal with peak power amplified from a first communication port of a first optical circulator, outputting from a second communication port of the first optical circulator into a fiber grating array, forming a reflecting surface by each fiber grating in the fiber grating array for reflecting the three-pulse light signal with peak power amplified, sequentially returning the three-pulse light signal reflected by the previous fiber grating and the three-pulse light signal reflected by the subsequent fiber grating to the first optical circulator at a certain interval in the fiber grating array, outputting the signals to a second erbium-doped fiber amplifier via a third communication port of the first optical circulator, performing amplification and filtering by the second erbium-doped fiber amplifier and a second optical filter, forming an interference light signal in a non-equilibrium Michelson interferometer composed of a three-in-three optical coupler, a first Faraday rotator mirror, a second Faraday rotator mirror, and an interferometer delay fiber, performing light splitting processing on the interference light signal by the three-in-three optical coupler, and outputting three paths of interference light signals having a preset phase difference;

step 4: performing photoelectric conversion on the three paths of interference light signals having a preset phase difference in a multi-channel photoelectric detector (24) respectively, and then conveying into a four-channel data acquisition card; and step 5: performing, by the four-channel data acquisition card), phase demodulation on three groups of received interference light intensity electrical signals using a three-in-three optical coupler digital demodulation algorithm to obtain corresponding distributed vibration information.

The beneficial effects of the present invention are as follows.

1. A polarization fading resistance technology is used herein to solve the problem of demodulation errors or low signal-to-noise ratio after demodulation caused by the phenomenon of polarization-induced fading in a distributed fiber sensing system, so that the minimum visibility of the system can be greater than 0.7.

2. A three-pulse shearing interference technology is adopted herein, it is unnecessary to modify other parts of the distributed fiber sensing system, it is only necessary to add a three-pulse generation polarization-maintaining structure to achieve polarization fading resistance, and the present invention has a simple structure and wide applicability, and can be universally applied to all distributed interferometric fiber sensing systems.

3. The three-pulse shearing interference technology is adopted herein to avoid the disadvantages of phase discontinuity when a demodulation signal is switched in a polarization switching technology and low time resolution of the system in the polarization switching technology, and the cost of the system is low because no polarization switch is required.

4. XX and XY pulses are utilized herein to complement interference visibility, and demodulation is performed by selecting a better path, so that polarization fading resistance and interference signal high visibility in a distributed fiber grating vibration sensing system are realized. Therefore, the vibration demodulation system according to the present invention can be better applied to the application fields where the environment disturbance is large and the distributed vibration signal measurement with high signal-to-noise ratio is required, such as rail, perimeter security, and fiber hydrophones.

DETAILED DESCRIPTION OF THE EMBODIMENTS

The present invention will now be described in further detail with reference to the accompanying drawings and specific embodiments.

Figure 1:
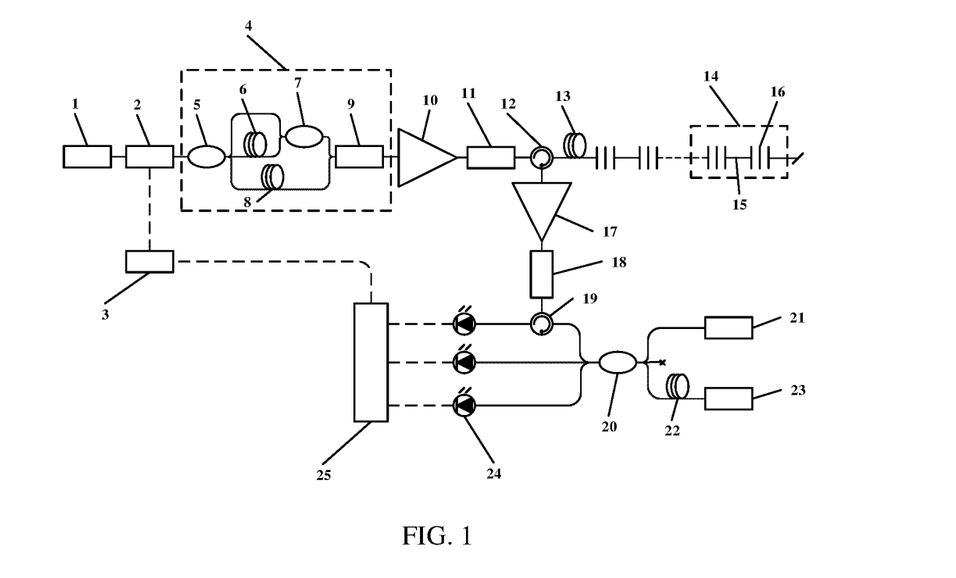
FIG. 1 is a schematic structure diagram of the present invention.

As shown in FIG. 1, a grating enhanced distributed vibration demodulation system based on three-pulse shearing interference, comprising: a laser device 1, a pulse optical modulator 2, a three-pulse generation polarization-maintaining structure 4, a first erbium-doped fiber amplifier 10, a first optical circulator 12, a fiber grating array 14, a second erbium-doped fiber amplifier 17, a second optical circulator 19, a three-in-three optical coupler 20, a first Faraday rotator mirror 21, a second Faraday rotator mirror 23, and a four-channel data acquisition card 25, wherein a signal output end of the laser device 1 is connected to a signal input end of the pulse optical modulator 2, a light pulse output end of the pulse optical modulator 2 is connected to a signal input end of the three-pulse generation polarization-maintaining structure 4, a signal output end of the three-pulse generation polarization-maintaining structure 4 is connected to a signal input end of the first erbium-doped fiber amplifier 10, a signal output end of the first erbium-doped fiber amplifier 10 is connected to a first communication port of the first optical circulator 12, a second communication port of the first optical circulator 12 is connected to the fiber grating array 14 via a sensing delay fiber 13, a third communication port of the first optical circulator 12 is connected to a signal input end of the second erbium-doped fiber amplifier 17, a signal output end of the second erbium-doped fiber amplifier 17 is connected to a first communication port of the second optical circulator 19, a second communication port of the second optical circulator 19 is connected to a first communication end on a left side of the three-in-three optical coupler 20, a first communication end on a right side of the three-in-three optical coupler 20 is connected to a communication end of the first Faraday rotator mirror 21, a second communication end on the right side of the three-in-three optical coupler 20 is suspended, a third communication end on the right side of the three-in-three optical coupler 20 is connected to a communication end of the second Faraday rotator mirror 23 through an interferometer delay fiber 22, and a third port of the second optical circulator 19, a second communication end on the left side of the three-in-three optical coupler 20, and a third communication end on the left side of the three-in-three optical coupler 20 are connected to an input end of the four-channel data acquisition card 25 through a multi-channel photoelectric detector 24 respectively.

In the above technical solution, further includes a first optical filter 11 and a second optical filter 18. The signal output end of the first erbium-doped fiber amplifier 10 is connected to a signal input end of the first optical filter 11. A signal output end of the first optical filter 11 is connected to the first communication port of the first optical circulator 12.

The signal output end of the second erbium-doped fiber amplifier 17 is connected to a signal input end of the second optical filter 18. A signal output end of the second optical filter 18 is connected to the first communication port of the second optical circulator 19.

In the above technical solution, a dual-channel pulse program generator 3 is further included. A first signal output channel of the dual-channel pulse program generator 3 is connected to a control signal input end of the pulse optical modulator 2. A second signal output channel of the dual-channel pulse program generator 3 is connected to a synchronous acquisition control end of the four-channel data acquisition card 25. By synchronously triggering the acquisition, the frequency stability requirements of the pulse program generator 3 are reduced.

In the above technical solution, the laser device 1 generates a laser signal having a wavelength matched with a fiber grating. The pulse optical modulator 2 is configured to modulate continuous light output by the laser device 1 into light pulses (the pulse optical modulator 2 is a semiconductor optical amplifier for changing an input continuous light signal into pulse light with a pulse width of 30 ns and a frequency of 30 kHz). After the light pulses enter the three-pulse generation polarization-maintaining structure 4, a three-pulse light signal with polarization states of X, X and Y is output. After the three-pulse light signal sequentially enters the first erbium-doped fiber amplifier 10 and the first optical filter 11, a three-pulse light signal with peak power amplified is output, and the three-pulse light signal with peak power amplified enters the fiber grating array 14 through the first optical circulator 12.

The three-pulse light signal with polarization states of X, X and Y means that the polarization states of first two pulses in the three-pulse light signal are the same and the polarization state of a third pulse is orthogonal to those of the first two pulses.

In the above technical solution, the three-pulse generation polarization-maintaining structure 4 includes a polarization-maintaining one-in-three optical coupler 5, a first polarization-maintaining delay fiber 6, a polarization-maintaining one-in-two optical coupler 7, a second polarization-maintaining delay fiber 8, and a polarization beam combiner 9. An output end of the pulse optical modulator 2 is connected to an input end of the polarization-maintaining one-in-three optical coupler 5. The polarization-maintaining one-in-three optical coupler 5 divides an input pulse into three paths of light pulses with the same polarization. A first-path output end of the polarization-maintaining one-in-three optical coupler 5 is connected to a first input end of the polarization-maintaining one-in-two optical coupler 7. A second-path output end of the polarization-maintaining one-in-three optical coupler 5 is connected to a second input end of the polarization-maintaining one-in-two optical coupler 7 through the first polarization-maintaining delay fiber 6. An output end of the polarization-maintaining one-in-two optical coupler 7 is connected to a first input end of the polarization beam combiner 9. A third-path output end of the polarization-maintaining one-in-three optical coupler 5 is connected to a second input end of the polarization beam combiner 9 through the second polarization-maintaining delay fiber 8. Three light pulses are combined into a three-pulse light signal with polarization states of X, X and Y at an output end of the polarization beam combiner 9 (the pulse width is 30 ns, and the pulse spacing is 40 ns).

In the above technical solution, the fiber grating array 14 includes a plurality of fiber gratings 16 and sensing fibers 15. Every two adjacent fiber gratings 16 are connected through one sensing fiber 15, and every two adjacent fiber gratings 16 are spaced equally. The spacing between every two adjacent fiber gratings 16 is 12 m. The spacing between gratings is equal in order to ensure that each sensing region spacing can match an interferometer, and the grating spacing length must ensure that there is no overlap between pulse groups returned by adjacent gratings. The middle sensing fiber is a common single-mode fiber, and there is a sensing region between every two adjacent fiber gratings 16. Polarization fading is mainly caused by a birefringence effect of the middle single-mode fiber.

In the above technical solution, the sensing fiber 15 has a reflectivity of −40 to −45 dB, and the three-pulse light signal with peak power amplified has a pulse width of 20 to 30 ns and a peak power intensity of 30 dBm. Considering the fiber grating spacing of 12 m, the pulse width and the peak power intensity need to be determined by calculation in order to avoid light pulses from covering two gratings simultaneously and to reduce the phase noise caused by Rayleigh scattering.

Figure 2:
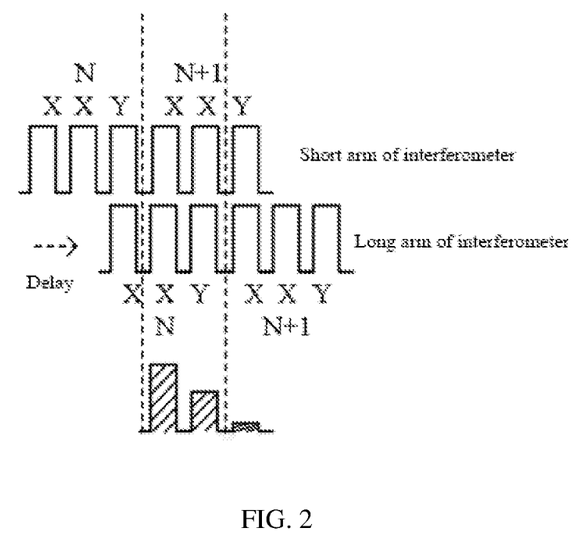
FIG. 2 is a schematic diagram of three-pulse shearing interference.

In the above technical solution, the three-in-three optical coupler 20, the first Faraday rotator mirror 21, the second Faraday rotator mirror 23, and the interferometer delay fiber 22 constitute a non-equilibrium Michelson interferometer having an interferometer arm length difference of 8 m. In the fiber grating array 14, a time difference between three light pulses reflected by the previous fiber grating 16 and three light pulses reflected by the subsequent fiber grating 16 is 120 ns, the three light pulses enter the non-equilibrium Michelson interferometer, the three light pulses reflected by the subsequent fiber grating 16 enter a short arm of the Michelson interferometer, and the three light pulses reflected by the previous fiber grating 16 enter a long arm of the Michelson interferometer with a length difference of 8 m, so that the second pulse (with a polarization state of X) and the third pulse (with a polarization state of Y) of three narrow light pulses reflected by the previous fiber grating 16 interfere with the first pulse (with a polarization state of X) and the second pulse (with a polarization state of X) of the three narrow light pulses reflected by the subsequent fiber grating 16 respectively. The three-in-three optical coupler 20 is also configured to perform light splitting processing on interference light to output three paths of interference light having a preset phase difference. The interference light is as shown in FIG. 2.

In the above technical solution, the four-channel data acquisition card 25 performs phase demodulation on two of three groups of received interference light intensity electrical signals with interference polarization states of XX and XY using a three-in-three optical coupler digital demodulation algorithm to obtain corresponding distributed vibration information, so that the requirements of distributed vibration sensing under polarization fading resistance is realized.

The visibility complementation proof process of two groups of interference light intensity electrical signals with polarization states of XX and XY acquired by using a three-pulse shearing interference method is as follows:

It is assumed that three detection pulse photoelectric fields before reaching an $N^{th}$ FBG are respectively:

$$\begin{cases} E_1 = A_0 e^{i(\omega t+\phi_1)} \begin{bmatrix} \sqrt{P_x} \\ \sqrt{1-P_x}\, e^{i\varepsilon} \end{bmatrix} \\ E_2 = A_0 e^{i(\omega t+\phi_2)} \begin{bmatrix} \sqrt{P_x} \\ \sqrt{1-P_x}\, e^{i\varepsilon} \end{bmatrix} \\ E_3 = A_0 e^{i(\omega t+\phi_3)} \begin{bmatrix} \sqrt{1-P_x} \\ \sqrt{P_x}\, e^{i(\varepsilon-\pi)} \end{bmatrix} \end{cases} \quad (1)$$

where $A_0$ is a light intensity of a pulse, i is a square root of −1, ω is an angular frequency of detection pulse light, t is time, $\phi_1$, $\phi_2$, $\phi_3$ are initial phases of first, second and third detection pulse light, $P_x$ is a polarization component of a detection pulse in a horizontal polarization (X-axis direction), ε is an initial phase of an electric field of light between horizontal and vertical polarizations, $E_1$, $E_2$ and $E_3$ are three detection pulse photoelectric fields respectively, and e is a natural constant.

The length of a sensing fiber between an $N^{th}$ FBG and an $(N+1)^{th}$ FBG is d, and a transmission matrix F and a reverse transmission matrix R thereof are as follows:

$$F = K \begin{bmatrix} \alpha + i\beta\cos 2q & -\gamma + i\beta\sin 2q \\ \gamma + i\beta\sin 2q & \alpha - i\beta\cos 2q \end{bmatrix} e^{i\phi_d} \quad (2)$$

$$R = K \begin{bmatrix} \alpha + i\beta\cos 2q & \gamma + i\beta\sin 2q \\ -\gamma + i\beta\sin 2q & \alpha - i\beta\cos 2q \end{bmatrix} e^{i\phi_d}$$

$$\begin{cases} \Delta = d(\rho^2 + \delta^2/4)^{1/2} \\ \alpha = \cos\Delta \\ \beta = \delta g d/2g \sin\Delta/\Delta \\ \gamma = \rho d \sin\Delta/\Delta \end{cases} \quad (3)$$

where Δ is a phase change caused by a pulse passing through the fiber, δ represents linear birefringence, and ρ represents circular birefringence. q is an angle of a linear birefringence fast axis relative to a Y axis, K is a loss coefficient of a light field, which is only related to the loss of a transmission fiber, and $\phi_d$ is a phase change caused by a pulse passing through the fiber. A Jones matrix RF of round-trip between two gratings is then as follows:

$$RF = \begin{bmatrix} \alpha^2 + \gamma^2 - \beta^2 + i\left(2\beta\sqrt{\alpha^2+\gamma^2}\cos(2q-\delta)\right) & i\left(2\beta\sqrt{\alpha^2+\gamma^2}\sin(2q-\delta)\right) \\ i\left(2\beta\sqrt{\alpha^2+\gamma^2}\sin(2q-\delta)\right) & \alpha^2 + \gamma^2 - \beta^2 - i\left(2\beta\sqrt{\alpha^2+\gamma^2}\cos(2q-\delta)\right) \end{bmatrix} = \quad (4)$$

-continued $$\begin{bmatrix} \cos\varphi + i\sin\varphi\cos\theta & i\sin\varphi\sin\theta \\ i\sin\varphi\sin\theta & \cos\varphi - i\sin\varphi\cos\theta \end{bmatrix}$$

$\cos\varphi = \alpha^2 + \gamma^2 - \beta^2 \quad \sin\varphi = 2\beta\sqrt{\alpha^2 + \gamma^2} \quad \theta = 2q - \delta$ To simplify the formula, $\varphi$ is defined, and $\theta$ is as shown above. A reflection matrix M of an FBG is (r is the reflectivity of the grating)

$$M = \begin{bmatrix} -r & 0 \\ 0 & r \end{bmatrix}.$$

Then the light intensities $I_{XX}$ and $I_{XY}$ of an XX interference pulse and an XY interference pulse are as follows:

$$I_{XX} = (ME_2 + RFE_1)'(ME_2 + RFE_1) = \qquad (5)$$
$$2I + 2I\sqrt{((1-2P_x)\cos\varphi)^2 + (\sin\varphi\cos\theta)^2}\cos(\Delta\phi_1 + \varphi_1)$$
$$I_{XY} = (ME_3 + RFE_2)'(ME_3 + RFE_2) =$$
$$2I + 2I\sqrt{(\sin\varphi\sin\theta)^2 + \left(-2\sqrt{P_x(1-P_x)}\cos\varphi\right)^2}\cos(\Delta\phi_2 + \varphi_2)$$

$$\begin{cases} \Delta\phi_1 = \phi_2 - (\phi_1 + 2\phi_d) \\ \varphi_1 = \arctan\dfrac{(\alpha^2 + \gamma^2 + \beta^2)(1 - 2P_x)\cos\varphi}{-(\alpha^2 + \gamma^2 + \beta^2)\sin\varphi\cos\theta} \\ \Delta\phi_2 = \phi_3 - (\phi_2 + 2\phi_d) \\ \varphi_2 = \arctan\dfrac{2(\alpha^2 + \gamma^2 + \beta^2)\sqrt{P_x(1-P_x)}\cos\varphi}{(\alpha^2 + \gamma^2 + \beta^2)\sin\varphi\sin\theta} \end{cases} \qquad (6)$$

I represents a light intensity of an interference pulse, $\Delta\phi_1$ represents a phase difference caused by an optical path difference when two beams of light of the XX interference pulse interfere, $\Delta\phi_2$ represents the phase difference caused by the optical path difference when the two beams of the XY interference pulse interfere, which is related to a measurement quantity such as vibration, $\varphi_1$ represents a polarization phase noise in the XX interference pulse, and $\varphi_2$ represents a polarization phase noise in the XY interference pulse.

The visibility of both the XX interference pulse and the XY interference pulse is as follows:

$$XX: \sqrt{((1-2P_x)\cos\varphi)^2 + (\sin\varphi\cos\theta)^2} \qquad (7)$$
$$XY: \sqrt{(\sin\varphi\sin\theta)^2 + \left(-2\sqrt{P_x(1-P_x)}\cos\varphi\right)^2}$$

The sum of squares of the two pulses is calculated to be 1.

In the grating enhanced distributed vibration demodulation system based on three-pulse shearing interference for polarization fading resistance, a demodulation method based on an arctangent algorithm is used: a combined fast algorithm of table look-up, coordinate rotation and approximation is used to demodulate three paths of interference output light intensity electrical signals. This method is a low-computation approximation algorithm which can meet the requirements of high accuracy and is easy to be implemented digitally. One table look-up, one coordinate rotation and one small-scale approximation are only needed to obtain an arctangent calculation result of $10^{-6}$ accuracy, and the storage space occupied by table look-up is very small.

In the above technical solution, the four-channel data acquisition card 25 performs phase demodulation on three groups of received interference light intensity electrical signals using a three-in-three optical coupler digital demodulation algorithm to obtain corresponding distributed vibration information.

In the above technical solution, the polarization-maintaining one-in-three optical coupler 5 has a splitting ratio of 2:2:1, and is configured to divide input linearly polarized light into three beams of pulse light with the same polarization and a power ratio of 2:2:1. The polarization-maintaining one-in-two optical coupler 7 is configured to decompose the pulse light into two beams of pulse light with the same polarization at a power ratio of 1:1.

A demodulation method according to the above system includes the following steps:

In step 1, a laser device 1 outputs a continuous light signal with a wavelength of 1550 nm.

In step 2, a pulse optical modulator 2 modulates the continuous light signal into light pulses using electrical pulses generated by a dual-channel pulse program generator 3, outputs a three-pulse light signal with polarization states of X, X and Y via a three-pulse generation polarization-maintaining structure 4, and outputs a three-pulse light signal with peak power amplified after the three-pulse light signal with polarization states of X, X and Y enters a first erbium-doped fiber amplifier 10.

In step 3, the three-pulse light signal with peak power amplified is accessed from a first communication port of a first optical circulator 12, and output from a second communication port of the first optical circulator 12 into a fiber grating array 14, a reflecting surface is formed by each fiber grating 15 in the fiber grating array 14 for reflecting the three-pulse light signal with peak power amplified (pulses returned by adjacent gratings will interfere in an interferometer), the three-pulse light signal reflected by the previous fiber grating 15 and the three-pulse light signal reflected by the subsequent fiber grating 15 are sequentially returned to the first optical circulator 12 at a certain interval (a grating spacing length multiplied by a time difference of 10 ns) in the fiber grating array 14, and output to a second erbium-doped fiber amplifier 17 via a third communication port of the first optical circulator 12, after performing amplification and filtering by the second erbium-doped fiber amplifier 17 and a second optical filter 18, an interference light signal is formed in a non-equilibrium Michelson interferometer composed of a three-in-three optical coupler 20, a first Faraday rotator mirror 21, a second Faraday rotator mirror 23, and an interferometer delay fiber 22, the three-in-three optical coupler 20 performs light splitting processing on the interference light signal, and three paths of interference light signals having a preset phase difference are output.

In step 4, photoelectric conversion is performed on the three paths of interference light signals having a preset phase difference in a multi-channel photoelectric detector 24 respectively, and then the signals are conveyed into a four-channel data acquisition card 25.

In step 5, the four-channel data acquisition card 25 performs phase demodulation on three groups of received interference light intensity electrical signals using a three-in-three optical coupler digital demodulation algorithm to obtain corresponding distributed vibration information.

The problem of demodulation errors caused by polarization-induced fading in the existing interferometric fiber grating vibration sensing system is solved, and high-visibility interference demodulation is realized, so that the present application can be applied to the application fields of rail vibration monitoring, hydrophone and the like which have the requirements of ultra-large-amplitude vibration signal measurement.

What is not described in detail in this specification belongs to the prior art known to those skilled in the art.

What is claimed is:

1. A grating enhanced distributed vibration demodulation system based on three-pulse shearing interference, comprising: a laser device, a pulse optical modulator, a three-pulse generation polarization-maintaining structure, a first erbium-doped fiber amplifier, a first optical circulator, a fiber grating array, a second erbium-doped fiber amplifier, a second optical circulator, a three-in-three optical couple, a first Faraday rotator mirror, a second Faraday rotator mirror, and a four-channel data acquisition card, wherein a signal output end of the laser device is connected to a signal input end of the pulse optical modulator, a light pulse output end of the pulse optical modulator is connected to a signal input end of the three-pulse generation polarization-maintaining structure, a signal output end of the three-pulse generation polarization-maintaining structure is connected to a signal input end of the first erbium-doped fiber amplifier, a signal output end of the first erbium-doped fiber amplifier is connected to a first communication port of the first optical circulator, a second communication port of the first optical circulator is connected to the fiber grating array via a sensing delay fiber, a third communication port of the first optical circulator is connected to a signal input end of the second erbium-doped fiber amplifier, a signal output end of the second erbium-doped fiber amplifier is connected to a first communication port of the second optical circulator, a second communication port of the second optical circulator is connected to a first communication end on a left side of the three-in-three optical coupler, a first communication end on a right side of the three-in-three optical coupler is connected to a communication end of the first Faraday rotator mirror, a second communication end on the right side of the three-in-three optical coupler is suspended, a third communication end on the right side of the three-in-three optical coupler is connected to a communication end of the second Faraday rotator mirror through an interferometer delay fiber, and a third port of the second optical circulator, a second communication end on the left side of the three-in-three optical coupler, and a third communication end on the left side of the three-in-three optical coupler are connected to an input end of the four-channel data acquisition card through a multi-channel photoelectric detector respectively.

2. The grating enhanced distributed vibration demodulation system based on three-pulse shearing interference according to claim 1, further comprising: a first optical filter and a second optical filter, wherein the signal output end of the first erbium-doped fiber amplifier is connected to a signal input end of the first optical filter, and a signal output end of the first optical filter is connected to the first communication port of the first optical circulator; and the signal output end of the second erbium-doped fiber amplifier is connected to a signal input end of the second optical filter, and a signal output end of the second optical filter is connected to the first communication port of the second optical circulator.

3. The grating enhanced distributed vibration demodulation system based on three-pulse shearing interference according to claim 1, further comprising: a dual-channel pulse program generator, wherein a first signal output channel of the dual-channel pulse program generator is connected to a control signal input end of the pulse optical modulator, and a second signal output channel of the dual-channel pulse program generator is connected to a synchronous acquisition control end of the four-channel data acquisition card.

4. The grating enhanced distributed vibration demodulation system based on three-pulse shearing interference according to claim 1, wherein the pulse optical modulator is configured to modulate continuous light output by the laser device into light pulses, after the light pulses enter the three-pulse generation polarization-maintaining structure, a three-pulse light signal with polarization states of X, X and Y is output, after the three-pulse light signal sequentially enters the first erbium-doped fiber amplifier and the first optical filter, a three-pulse light signal with peak power amplified is output, and the three-pulse light signal with peak power amplified enters the fiber grating array through the first optical circulator; and the three-pulse light signal with polarization states of X, X and Y means that the polarization states of first two pulses in the three-pulse light signal are the same and the polarization state of a third pulse is orthogonal to those of the first two pulses.

5. The grating enhanced distributed vibration demodulation system based on three-pulse shearing interference according to claim 1, wherein the three-pulse generation polarization-maintaining structure comprises a polarization-maintaining one-in-three optical coupler, a first polarization-maintaining delay fiber, a polarization-maintaining one-in-two optical coupler, a second polarization-maintaining delay fiber, and a polarization beam combiner, wherein an output end of the pulse optical modulator is connected to an input end of the polarization-maintaining one-in-three optical coupler, the polarization-maintaining one-in-three optical coupler divides an input pulse into three paths of light pulses with the same polarization, a first-path output end of the polarization-maintaining one-in-three optical coupler-is connected to a first input end of the polarization-maintaining one-in-two optical coupler, a second-path output end of the polarization-maintaining one-in-three optical coupler is connected to a second input end of the polarization-maintaining one-in-two optical coupler through the first polarization-maintaining delay fiber, an output end of the polarization-maintaining one-in-two optical coupler is connected to a first input end of the polarization beam combiner, a third-path output end of the polarization-maintaining one-in-three optical coupler is connected to a second input end of the polarization beam combiner through the second polarization-maintaining delay fiber, and three light pulses are combined into a three-pulse light signal with polarization states of X, X and Y at an output end of the polarization beam combiner.

6. The grating enhanced distributed vibration demodulation system based on three-pulse shearing interference according to claim 1, wherein the fiber grating array-comprises a plurality of fiber gratings and sensing fibers, every two adjacent fiber gratings are connected through one sensing fiber, and every two adjacent fiber gratings are spaced equally.

7. The grating enhanced distributed vibration demodulation system based on three-pulse shearing interference according to claim 1, wherein the sensing fiber has a reflectivity of −40 to −45 dB, and the three-pulse light signal with peak power amplified has a pulse width of 20 to 30 ns and a peak power intensity of 30 dBm.

8. The grating enhanced distributed vibration demodulation system based on three-pulse shearing interference according to claim 1, wherein the three-in-three optical coupler, the first Faraday rotator mirror, the second Faraday rotator mirror, and the interferometer delay fiber constitute a non-equilibrium Michelson interferometer.

9. The grating enhanced distributed vibration demodulation system based on three-pulse shearing interference according to claim 1, wherein the four-channel data acquisition card performs phase demodulation on three groups of received interference light intensity electrical signals using a three-in-three optical coupler digital demodulation algorithm to obtain corresponding distributed vibration information.

10. A demodulation method for the system according to claim 1, comprising the following steps:
   step 1: outputting, by a laser device, a continuous light signal;
   step 2: modulating, by a pulse optical modulator, the continuous light signal into light pulses using electrical pulses generated by a dual-channel pulse program generator, outputting a three-pulse light signal with polarization states of X, X and Y via a three-pulse generation polarization-maintaining structure, and after the three-pulse light signal with polarization states of X, X and Y enters a first erbium-doped fiber amplifier, outputting a three-pulse light signal with peak power amplified;
   step 3: accessing the three-pulse light signal with peak power amplified from a first communication port of a first optical circulator, outputting from a second communication port of the first optical circulator into a fiber grating array, forming a reflecting surface by each fiber grating in the fiber grating array for reflecting the three-pulse light signal with peak power amplified, sequentially returning the three-pulse light signal reflected by the previous fiber grating and the three-pulse light signal reflected by the subsequent fiber grating to the first optical circulator at a certain interval in the fiber grating array, outputting the signals to a second erbium-doped fiber amplifier via a third communication port of the first optical circulator, performing amplification and filtering by the second erbium-doped fiber amplifier and a second optical filter, forming an interference light signal in a non-equilibrium Michelson interferometer composed of a three-in-three optical coupler, a first Faraday rotator mirror, a second Faraday rotator mirror, and an interferometer delay fiber, performing light splitting processing on the interference light signal by the three-in-three optical coupler, and outputting three paths of interference light signals having a preset phase difference;
   step 4: performing photoelectric conversion on the three paths of interference light signals having a preset phase difference in a multi-channel photoelectric detector respectively, and then conveying into a four-channel data acquisition card; and
   step 5: performing, by the four-channel data acquisition card, phase demodulation on three groups of received interference light intensity electrical signals using a three-in-three optical coupler digital demodulation algorithm to obtain corresponding distributed vibration information.

* * * * *